United States Patent
Chang et al.

(10) Patent No.: US 10,021,547 B2
(45) Date of Patent: Jul. 10, 2018

(54) MANAGEMENT FOR DATA TRANSMISSION OF APPLICATIONS

(71) Applicant: HTC Corporation, Taoyuan (TW)

(72) Inventors: Cheng-Ho Chang, Taoyuan (TW); Hsin-Yuan Chang, Taoyuan (TW); Jyun-Jhong Lin, Taoyuan (TW); Po-Kai Huang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/293,306

(22) Filed: Oct. 14, 2016

(65) Prior Publication Data

US 2017/0215022 A1    Jul. 27, 2017

Related U.S. Application Data

(60) Provisional application No. 62/286,450, filed on Jan. 25, 2016.

(51) Int. Cl.
*H04W 4/00* (2018.01)
*H04W 28/20* (2009.01)
(Continued)

(52) U.S. Cl.
CPC .......... *H04W 4/50* (2018.02); *H04L 43/0805* (2013.01); *H04L 47/76* (2013.01); *H04L 47/803* (2013.01);
(Continued)

(58) Field of Classification Search
CPC ..... H04W 4/001; H04W 28/20; H04W 88/02; H04W 4/50; H04L 43/0805; H04L 47/76; H04L 47/803; H04L 67/14
(Continued)

(56) References Cited

U.S. PATENT DOCUMENTS

| 8,458,357 B2 * | 6/2013 | Menchaca ........... G06F 3/04847 709/224 |
| 9,008,673 B1 * | 4/2015 | Sanjeev ................. H04L 43/16 370/229 |

(Continued)

OTHER PUBLICATIONS

Corresponding Taiwanese office action dated Aug. 11, 2017.
Corresponding extended European search report dated Jun. 27, 2017.

*Primary Examiner* — Babar Sarwar
(74) *Attorney, Agent, or Firm* — CKC & Partners Co., Ltd.

(57) ABSTRACT

A wireless communication device includes a transceiver and processing circuitry. The transceiver is configured to establish a telecommunication connection with a total usable bandwidth. The processing circuitry is coupled to the transceiver. The processing circuitry is configured at least to monitor a foreground throughput of data transmission induced by a foreground application program and a background throughput of data transmission induced by a background application program over the telecommunication connection. The processing circuitry is further configured at least to detect whether the foreground application program and the background application program compete for the total usable bandwidth or not according to variations of the foreground throughput and the background throughput. If the foreground application program and the background application program compete the total usable bandwidth, the processing circuitry is further configured at least to, limit the data transmission induced by the background application program

16 Claims, 4 Drawing Sheets

(51) Int. Cl.
*H04W 4/50* (2018.01)
*H04L 12/26* (2006.01)
*H04L 29/08* (2006.01)
*H04L 12/917* (2013.01)
*H04L 12/927* (2013.01)
*H04W 88/02* (2009.01)

(52) U.S. Cl.
CPC ............ *H04L 67/14* (2013.01); *H04W 4/001* (2013.01); *H04W 28/20* (2013.01); *H04W 88/02* (2013.01)

(58) Field of Classification Search
USPC .... 455/412.1–414.2, 418–422.1, 436, 552.1, 455/452.2, 456.1, 41.2, 41.1; 709/223–230
See application file for complete search history.

(56) References Cited

U.S. PATENT DOCUMENTS

| | | | | |
|---|---|---|---|---|
| 2004/0013089 | A1* | 1/2004 | Taneja | H04L 47/14 370/235 |
| 2004/0230444 | A1* | 11/2004 | Holt | G07F 17/32 370/329 |
| 2006/0146874 | A1* | 7/2006 | Yuan | H04L 47/10 370/468 |
| 2007/0180119 | A1* | 8/2007 | Khivesara | H04L 12/1881 709/226 |
| 2010/0088707 | A1* | 4/2010 | Corn | G06F 9/5027 718/104 |
| 2010/0098092 | A1* | 4/2010 | Luo | H04L 12/4633 370/401 |
| 2010/0144332 | A1* | 6/2010 | Savoor | H04W 72/1242 455/418 |
| 2010/0299552 | A1* | 11/2010 | Schlack | H04L 47/10 714/4.1 |
| 2012/0252362 | A1* | 10/2012 | Kawata | G06K 19/0719 455/41.1 |
| 2012/0254427 | A1* | 10/2012 | Adams | H04L 12/2823 709/225 |
| 2013/0100955 | A1* | 4/2013 | Dunlap | H04L 47/76 370/392 |
| 2013/0191541 | A1* | 7/2013 | Kishan | G06F 9/5011 709/226 |
| 2014/0043987 | A1* | 2/2014 | Watve | H04L 45/70 370/252 |
| 2014/0226571 | A1* | 8/2014 | Das | H04L 41/0896 370/329 |
| 2014/0247731 | A1* | 9/2014 | Nagaraj | H04W 36/30 370/252 |
| 2015/0019740 | A1* | 1/2015 | Zhao | H04L 41/5022 709/226 |
| 2015/0106502 | A1* | 4/2015 | Shakhmetov | H04L 47/76 709/224 |
| 2015/0117213 | A1* | 4/2015 | Pinheiro | H04W 28/0284 370/235 |
| 2015/0178015 | A1 | 6/2015 | Povzner et al. | |
| 2015/0309811 | A1* | 10/2015 | Wisgo | H04W 4/00 719/331 |
| 2015/0373588 | A1* | 12/2015 | C K | H04W 28/24 370/329 |
| 2016/0007233 | A1* | 1/2016 | Rao | H04W 72/1242 455/452.2 |

\* cited by examiner

MANAGEMENT FOR DATA TRANSMISSION OF APPLICATIONS

RELATED APPLICATIONS

This application claims priority to U.S. Provisional Application Ser. No. 62/286,450, filed Jan. 25, 2016, which is herein incorporated by reference.

BACKGROUND

Technical Field

The present invention relates to a wireless communication device and its control method. More particularly, the present invention relates to a control method to manage data transmission induced by different applications.

Description of Related Art

A modern mobile device, such as a smart phone, a personal digital assistant, or a tablet computer, is usually capable of performing multiple tasks in parallel. For example, the user can utilize the mobile device to browse a website and also listen to a radio station. At the same time, the mobile device might also update its operating system, uploading some data to a backup server and/or receiving messages sent from other devices.

Aforementioned data exchange is transmitted over a telecommunication connection with a network bandwidth. The user will experience latency or delay when different applications/functions are fighting for the network bandwidth. The latency or delay will disturb the user experience, especially when the telecommunication connection has a limited and low usable bandwidth.

SUMMARY

The disclosure provides an embodiment of a wireless communication device, which includes a transceiver and processing circuitry. The transceiver is configured to establish a telecommunication connection with a total usable bandwidth. The processing circuitry is coupled to the transceiver. The processing circuitry is configured at least to monitor a foreground throughput of data transmission induced by a foreground application program and a background throughput of data transmission induced by a background application program over the telecommunication connection. The processing circuitry is further configured at least to detect whether the foreground application program and the background application program compete for the total usable bandwidth or not according to variations of the foreground throughput and the background throughput. If the foreground application program and the background application program compete for the total usable bandwidth, the processing circuitry is further configured at least to, limit the data transmission induced by the background application program.

Another embodiment of the disclosure is a control method suitable for a wireless communication device comprising a transceiver and processing circuitry. The transceiver is configured to establish a telecommunication connection. A foreground application program and a background application program are executed by the processing circuitry. The control method includes following operations. A foreground throughput of data transmission induced by the foreground application program and a background throughput of data transmission induced by the background application program over the telecommunication connection are monitored. Whether the foreground application program and the background application program compete for the total usable bandwidth or not are detected according to variations of the foreground throughput and the background throughput. If the foreground application program and the background application program compete for the total usable bandwidth, the data transmission induced by the background application program is limited.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
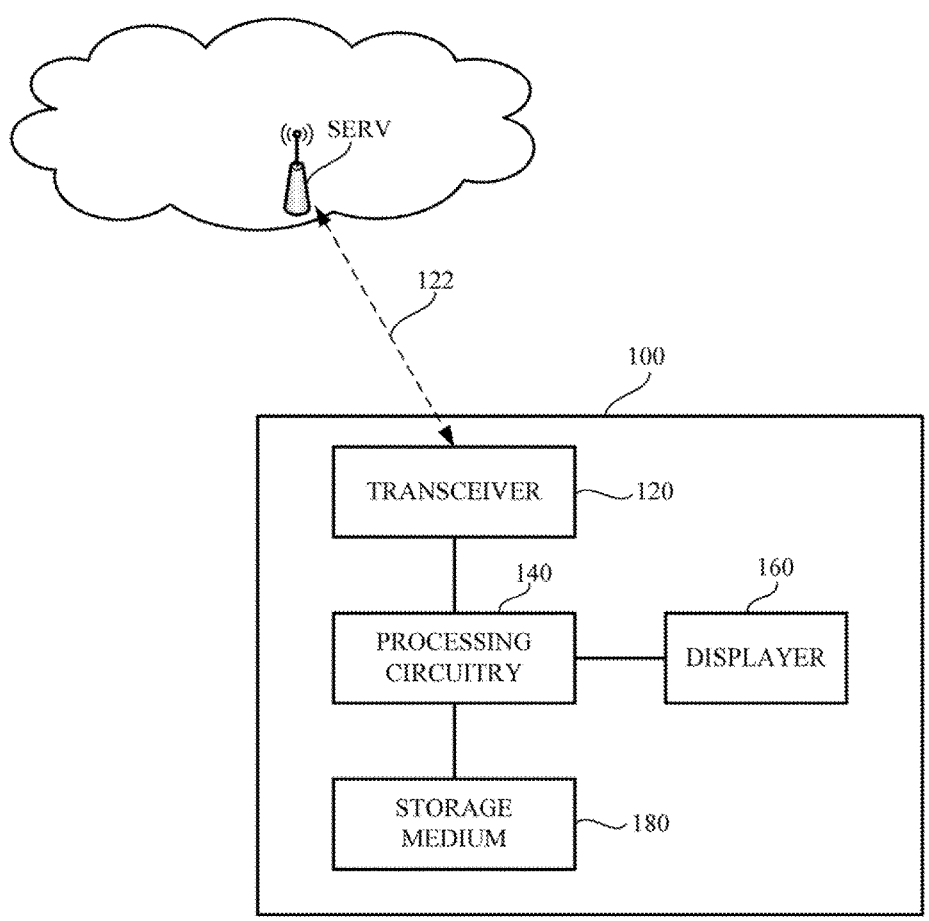
FIG. 1 is a schematic diagram illustrating a wireless communication device according to an embodiment of this disclosure.

The following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Reference is made to FIG. 1, which is a schematic diagram illustrating a wireless communication device 100 according to an embodiment of this disclosure. The wireless communication device 100 includes a transceiver 120 and processing circuitry 140. The transceiver 120 is configured to establish a telecommunication connection 122 to a network server SERV. In some embodiments, the transceiver 120 includes a mobile network antenna (not shown in figures) which is able to transmit data to the network server SERV or receive data from the network server SERV based on one or more mobile network protocols. The processing circuitry 140 is coupled with the transceiver 120, and the processing circuitry 140 configured to process general computations and control functions on the wireless communication device 100. In some embodiments, the wireless communication device 100 is a smart phone, a personal digital assistant, a tablet computer or any equivalent electronic device with telecommunication ability.

In some embodiments, the transceiver 120 is able to establish the telecommunication connection 122 based on different mobile network protocols selected from 2nd generation network protocols (2G), 3rd generation network protocols (3G) and 4th generation network protocols (4G). The 2G network protocols include, for example, Global System for Mobile Communications (GSM) network protocol. The 3G network protocols include, for example, a Wideband Code Division Multiple Access (WCDMA) network protocol, a Telecommunications System (UMTS) network protocol and/or a Third Generation Partnership Project 2 (3GPP2) network protocol. The 4G mobile network protocols include, for example, a Long Term Evolution (LTE) network protocol and/or a Worldwide Interoperability for Microwave Access (WiMax) network protocol. In some embodiments, the transceiver 120 includes a network telecommunication circuit, an antenna, and/or an antenna driving circuit.

The processing circuitry 140 in some embodiments as illustrated in FIG. 1 includes a processor, a control unit, a network control integrated circuit (IC), a Central Processing Unit (CPU) or a System-on-Chip (SoC) circuit or any equivalent processing circuitry. For example, the processing circuitry 140 includes a general-purpose processor for handling general functions on the wireless communication device 100, such as computation, data accessing, power management, executing application programs, telephony functions and any equivalent functions.

As illustrated in FIG. 1, the wireless communication device 100 may further include other components such as a displayer 160 and storage medium 180. The displayer 160 is utilized to show some information or data. The storage medium 180 is utilized to store some data, information, application programs, software or firmware of the wireless communication device 100.

Figure 2:
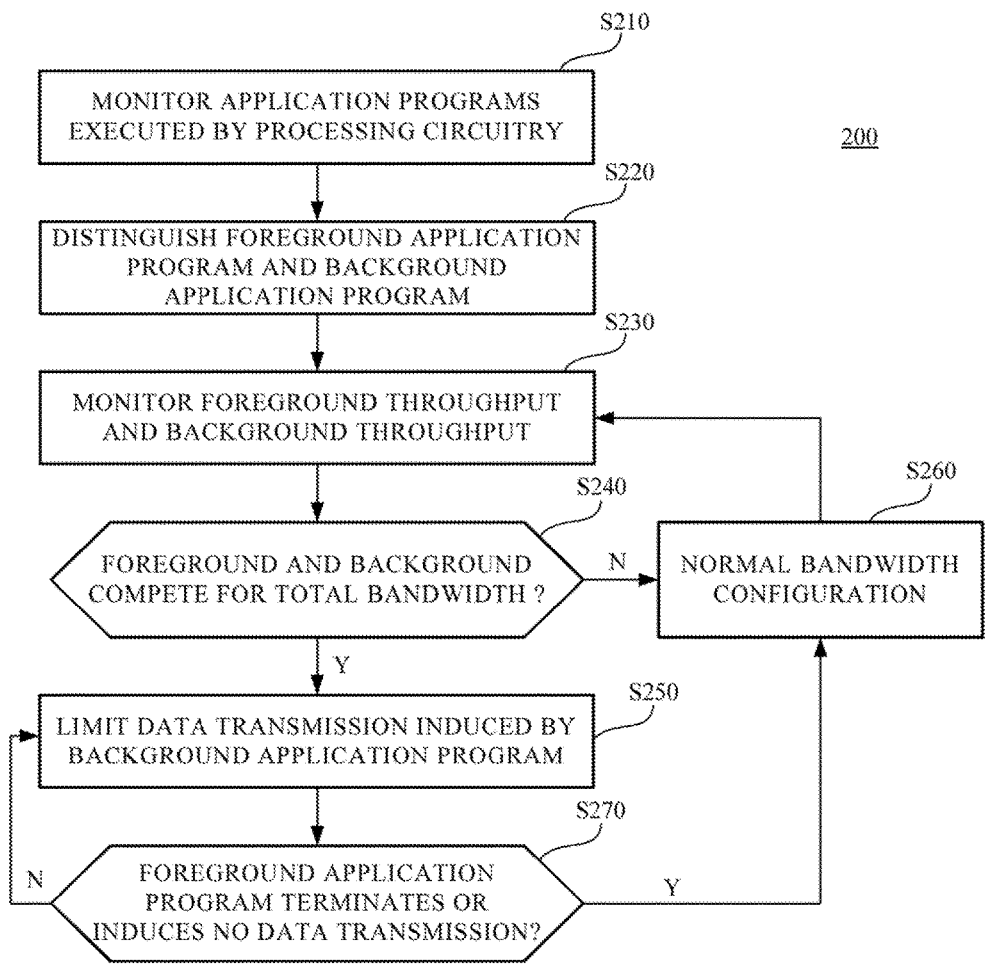
FIG. 2 is a flow diagram illustrating a control method suitable for controlling the wireless communication device in FIG. 1.

Reference is made to FIG. 2, which is a flow diagram illustrating a control method 200 suitable for controlling the wireless communication device 100 in FIG. 1. As shown in FIG. 2, operation S210 is executed to monitor application programs executed by the processing circuitry 140 in FIG. 1. In some embodiments, the application programs are some software codes, instructions or procedures stored in the storage medium 180.

While the application programs are executed, some of the application programs running in foreground as foreground application programs and also some others of the application programs are as background application programs. Background application programs are executed by the processing circuitry 140 without directly interacting with users. Results or information of the foreground application programs are reflected on the user interface on the displayer 160, such that users can acknowledge these information/results of the foreground application programs directly.

As shown in FIG. 2, operation S220 is executed to distinguish a first group of the application programs currently running in foreground and a second group of the application programs currently running in background according to a list of process identifications by the processing circuitry 140 in FIG. 1. The first group of the application programs currently running in foreground includes one application program or multiple application programs. The second group of the application programs currently running in background includes one application program or multiple application programs.

For example, when the user browse a website with a flash-based animation on the World Wide Web (WWW) over the telecommunication connection 122 by the wireless communication device 100, a browser application and a flash player application are launched and run in foreground to show the contents of the website. At the same time, the wireless communication device 100 downloads data in background for an operating system update from a network server over the telecommunication connection 122 and also uploads a contact list to a remote backup server. The foreground application programs (e.g., the browser application and the flash player application) and the background application programs (e.g., the system update application and the backup application) activate their data transmission.

The first group of the application programs currently running in foreground includes one or more application program(s). The second group of the application programs currently running in background includes one or more application program(s). For brevity of descriptions, "the foreground application program" in the following paragraphs of the disclosure indicates one foreground application program or a group of multiple foreground application programs, and "the background application program" in the following paragraphs of the disclosure indicates one background application program or a group of multiple background application programs.

In some embodiments, the operating system (e.g., Android system, iOS system, windows 10 system, linux-based system, etc) of the wireless communication device 100 will has a list of current running processes. The list will record process identifications (process ID) of current running processes and running states (including running in foreground or in background) of these processes. The processing circuitry 140 is configured to distinguish the foreground application program and the background application program according to the list of process identifications.

As shown in FIG. 2, operation S230 is executed, by the processing circuitry 140 in FIG. 1, to monitor a foreground throughput of data transmission induced by the foreground application program and the background throughput of data transmission induced by the background application program over the telecommunication connection 122 established by the transceiver 120 in FIG. 1. The foreground throughput is calculated by accumulating all throughputs induced by one or more foreground application program(s) into an overall throughput during a period of time. The background throughput is calculated by accumulating all throughputs induced by one or more background application program(s) into another overall throughput during the same period of time (as calculating the foreground throughput) or during another period of time.

In some embodiments, the telecommunication connection 122 established by the transceiver 120 has a total usable bandwidth. The total usable bandwidth is affected by many factors, such as a wireless signal strength, a telecommunication protocol (2G, 3G, 4G. WiFi, Wimax, BT, etc) utilized by the transceiver 120, environmental noises, an amount of other client devices under the same network domain, etc. In practices, it is not easy to acknowledge an exact value/size of the total usable bandwidth because the total usable bandwidth will vary over time (e.g., the user carrying the wireless communication device 100 is moving, or the user hold the wireless communication device 100 in different ways).

As shown in FIG. 2, operation S240 is executed, by the processing circuitry 140 in FIG. 1, to detect whether the foreground application program and the background application program compete for the total usable bandwidth or not. Since it is hard to acknowledge the exact value/size of the total usable bandwidth, operation S240 in some embodiments provides an approach to detect whether the foreground application program and the background application program compete for the total usable bandwidth according to variations of the foreground throughput and the background throughput. Details of operation S240 about how to detect the competition for the total usable bandwidth will be discussed later along with FIG. 3 and FIG. 4.

As shown in FIG. 2, if the foreground application program and the background application program are detected in operation S240 to compete for the total usable bandwidth, operation S250 is executed, by the processing circuitry 140 in FIG. 1, to limit the data transmission induced by the background application program. In some embodiments, operation S250 is performed by reducing a background bandwidth share within the total usable bandwidth, so as to release more bandwidth to the foreground application programs. In this case, the user will have better user experience and less latency when the user manipulates the foreground application program to perform some network-related functions.

On the other hand, if the foreground application program and the background application program detected in operation S240 do not compete for the total usable bandwidth, operation S260 is executed to apply a normal bandwidth configuration. For example, according to the normal bandwidth configuration, the total usable bandwidth is evenly allocated to each of application programs requesting for data transmission with no specific limitations to foreground/background application programs.

After limiting the data transmission induced by the background application program in operation S250, operation S270 is executed, by the processing circuitry 140 in FIG. 1, to detect whether the foreground application program terminates or induces no data transmission (stop transmitting or receiving data over the telecommunication connection 122). If the foreground application program persists and performs the data transmission, the control method 200 returns to operation S250 and keeps the limitation to the background application program. If the foreground application program terminates or induces no data transmission, the control method 200 executes operation S260 and release the limitation (by operation S250) to the background application program.

Figure 3:
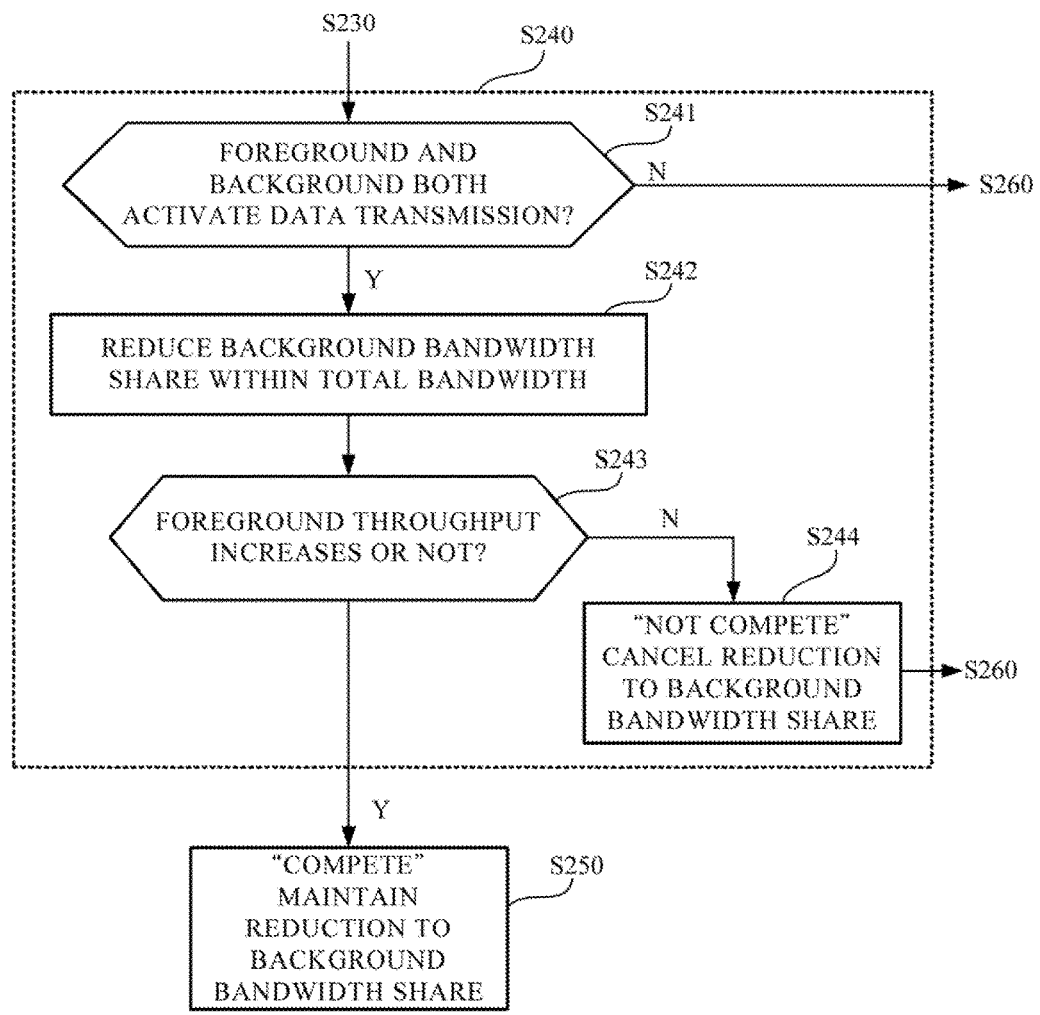
FIG. 3 is a flow diagram illustrating sub-operations of an operation in the control method shown in FIG. 2 according to some embodiments of the disclosure.

Reference is further made to FIG. 3, which is a flow diagram illustrating sub-operations of operation S240 in the control method 200 shown in FIG. 2 according to some embodiments of the disclosure. As shown in FIG. 3, operation S240 includes sub-operations S241-S244 to detect whether the foreground application program and the background application program compete or not. At first, sub-operations S241 in FIG. 3 is executed to detect whether the foreground application program and the background application program both activate their data transmission. If one of the foreground application program or the background application program does not activate the data transmission, there will be obviously no competition between the foreground application program and the background application program for the total usable bandwidth, and the control method 200 executes operation S260.

If both of the foreground application program or the background application program activate their data transmission, sub-operations S242 in FIG. 3 is executed to reduce the background bandwidth share within the total usable bandwidth from a first level to a second level. The second level is lower than the first level. For example, the background bandwidth share is original at 50% (i.e., the first level) of the total usable bandwidth, and sub-operations S242 is executed to reduce the background bandwidth share to 40% (i.e., the second level) of the total usable bandwidth. In some embodiments, the background bandwidth share is modulated by assigning 40% time of the transceiver 120 in FIG. 1 to handle the data packet from the background application programs, and assigning 60% time of the transceiver 120 in FIG. 1 to handle the data packet from the foreground application programs. In some other embodiments, the background bandwidth share is modulated by allocating 40% queue space of the transceiver 120 in FIG. 1 to accommodate the data packet from the background application programs, and allocating 60% queue space of the transceiver 120 in FIG. 1 to accommodate the data packet from the foreground application programs. Therefore, the background bandwidth share is able to be modulated without knowing the exact value/size of the total usable bandwidth.

In some embodiments, when the data transmission of the foreground application program is switched from an idle mode to a burst mode and the data transmission of the background application program is in a persistent mode, sub-operations S242 in FIG. 3 is executed to reduce the background bandwidth share from the first level to the second level. The idle mode indicates that there is no data transmission. The burst mode indicates that the data transmission is just launched. The persistent mode indicates that the data transmission has been launched and continues for a period of time (e.g., over 100 microseconds, 1 second, etc).

After the background bandwidth share is reduced to the second level, sub-operations S243 in FIG. 3 is executed to detect whether the foreground throughput increases or not.

If the foreground throughput increases after reducing the background bandwidth share (e.g., the foreground throughput increases from 3 Mbps to 6 Mbps after sub-operations S242), the foreground application program and the background application program are regarded as in competition for the total usable bandwidth, and the reduction to the background bandwidth share will be maintained. The increment of the foreground throughput means the foreground application program demands for more bandwidth. In this case, the background bandwidth share is maintained at the second level (e.g., 40%), and the data transmission induced by the background application program is limited (referring to operation S250 in FIG. 1 and FIG. 2).

If the foreground throughput does not increase after reducing the background bandwidth share (e.g., the foreground throughput remains at 3 Mbps after sub-operations S242 in FIG. 3), the foreground application program and the background application program are regarded as not competing for the total usable bandwidth, sub-operation S244 in FIG. 3 is executed to cancel the reduction to the background bandwidth share. In some embodiments, the background bandwidth share will be restored to the first level. In this case, it means that the bottleneck of the foreground throughput is not the bandwidth allocated to the foreground application program. In some examples, the foreground application program (e.g., involving transmission of text contents) does not require more bandwidth. In some other examples, the foreground throughput is limited due to a process source or a network resource of the network server SERV related to the foreground application program. Then, the control method 200 executes operation S260 shown in FIG. 1.

Aforesaid embodiments shown in FIG. 1 and FIG. 2 demonstrate a static traffic control to reduce the background bandwidth share to the second level. The static traffic control can be used to modulate the bandwidth configuration when the data transmission of the foreground application program is just switched from the idle mode to the burst mode and the data transmission of the background application program is in the persistent mode. However, the disclosure is not limited to the static traffic control.

Figure 4:
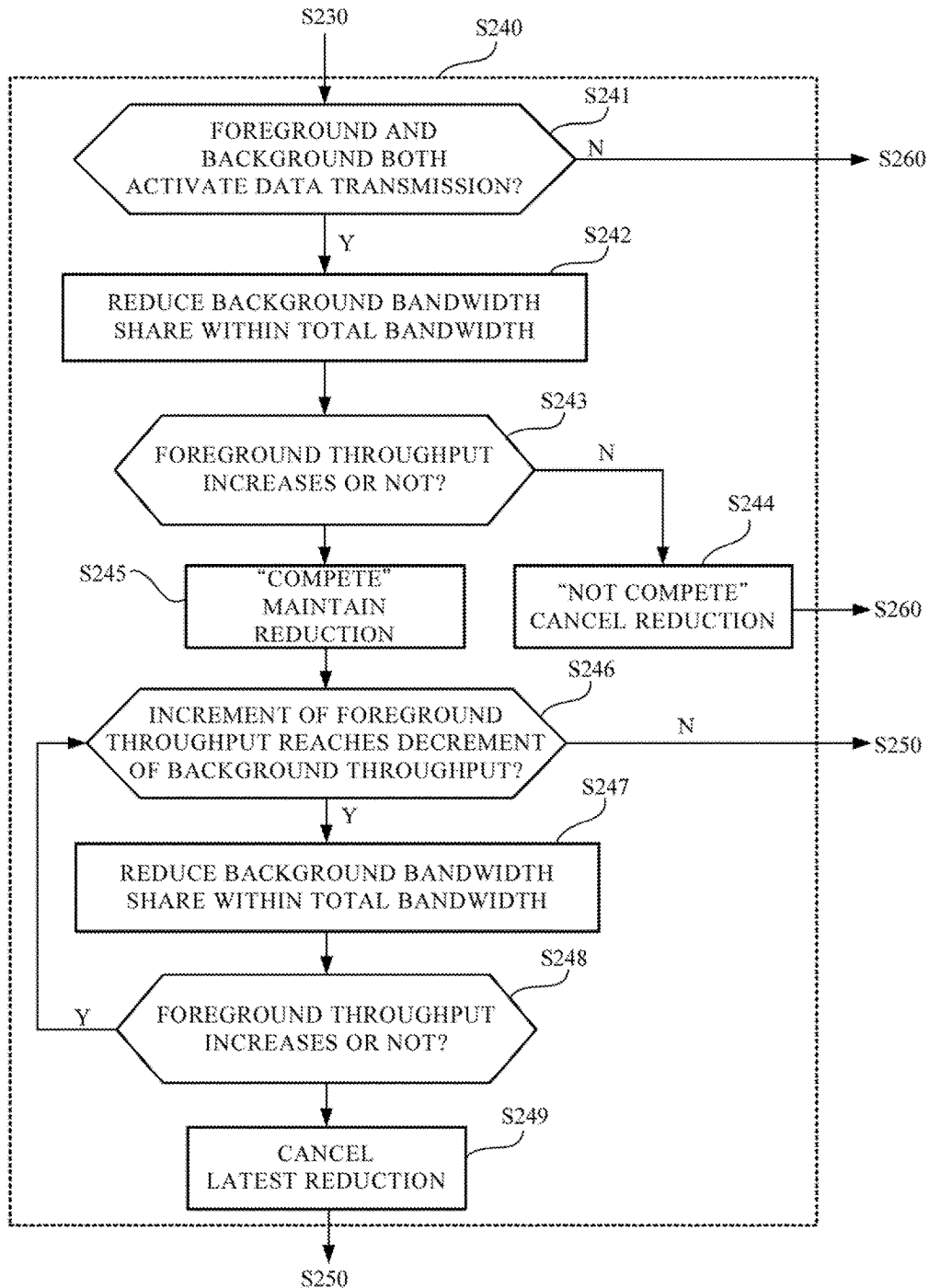
FIG. 4 is a flow diagram illustrating sub-operations of an operation in the control method shown in FIG. 2 according to some other embodiments of the disclosure.

Reference is further made to FIG. 4, which is a flow diagram illustrating sub-operations of operation S240 in the control method 200 shown in FIG. 2 according to some other embodiments of the disclosure. In embodiments shown in FIG. 4, operation S240 includes sub-operations S241-S249. Sub-operations S241 to S244 shown in FIG. 4 are similar to discussed sub-operations S241 to S244 shown in aforesaid embodiments of FIG. 3, and details of sub-operations S241 to S244 will not be repeated here again.

As shown in FIG. 4, if the foreground throughput increases after reducing the background bandwidth share (e.g., the foreground throughput increases from 3 Mbps to 6 Mbps after sub-operations S242), the foreground application program and the background application program are regarded as in competition for the total usable bandwidth, and sub-operations S245 is executed to maintain the reduction to the background bandwidth share, such that the background bandwidth share is limited to the second level (e.g., 40%).

As shown in FIG. 4, sub-operations S246 is executed, by the processing circuitry in FIG. 1, to detect whether an increment of the foreground throughput reaches a decrement of the background throughput after reducing the background bandwidth share.

In some embodiments, the increment of the foreground throughput and the decrement of the background throughput are detected (i.e., sub-operations S246) when the data transmissions of the foreground application program and the background application program are in the persistent mode, which means the foreground application program and the background application program continuously perform data transmission. Once the foreground application program terminates or no data transmission induced by the foreground application program, the control method 200 will cancel the limitation to the background application programs and return to operation S260 (not shown in FIG. 4).

If the increment of the foreground throughput is lower than the decrement of the background throughput, such as the background throughput decreases from 10 Mbps to 6 Mbps and the foreground throughput increases from 3 Mbps to 5 Mbps, the background bandwidth share will be maintained at the second level (e.g., 40%). In this case, the increment of the foreground throughput is 2 Mbps which is lower than the decrement of the background throughput is 4 Mbps. It means the foreground bandwidth share after reduction of sub-operation S242 is now enough for the foreground application program, and the foreground throughput will not increase further even when more bandwidth is given the foreground application program. Therefore, the background bandwidth share will be maintained at the second level without further reduction.

If the increment of the foreground throughput reaches the decrement of the background throughput, such as the background throughput decreases from 10 Mbps to 6 Mbps and the foreground throughput increases from 3 Mbps to 7 Mbps (i.e., the increment of the foreground throughput is 4 Mbps equal to the decrement of the background throughput), and it means the foreground application program may require more bandwidth share to enlarge the foreground throughput.

If the increment of the foreground throughput reaches the decrement of the background throughput (the foreground throughput increases from 3 Mbps to 7 Mbps and the background throughput decreases from 10 Mbps to 6 Mbps), sub-operation S247 in FIG. 4 is executed to reduce the background bandwidth share within the total usable bandwidth from the second level to a third level. The third level is lower than the second level. For example, the background bandwidth share is further reduced to 35% of the total usable bandwidth. In some embodiments, the background bandwidth share is modulated by assigning 35% time of the transceiver 120 in FIG. 1 to handle the data packet from the background application programs. In some other embodiments, the background bandwidth share is modulated by allocating 35% queue space of the transceiver 120 in FIG. 1 to accommodate the data packet from the background application programs.

As shown in FIG. 4, after the background bandwidth share is further reduced to the third level, sub-operation S248 is executed to detect whether the foreground throughput increase again after the reduction in sub-operation S248. If the foreground throughput does not increase (e.g., the foreground throughput stays at 7 Mbps), it means that the foreground application program does not require more bandwidth share or the bottleneck of the foreground throughput is not related to the bandwidth share, sub-operation S249 will be executed to cancel the latest reduction to the background bandwidth share (in S247), such as the background bandwidth share will be restored to 40% of the total usable bandwidth.

If the foreground throughput increase again (e.g., the foreground throughput increase from 7 Mbps to 9 Mbps), the control method 200 returns to sub-operation S246. If the foreground throughput keep increased after reducing the background bandwidth share and the increment of the foreground throughput reaches the decrement of the background throughput, the control method 200 is able to repeat sub-operations S246-S248, so as to repeatedly reduce the background bandwidth share (further to 30%, 25%, 20%, 15%, etc) until the background bandwidth share is reduced a minimum bandwidth share. The minimum bandwidth share is related to a minimum bandwidth to maintain the connectivity of the background application program to the corresponding network server SERV. For example, the minimum bandwidth share is set at 15% to prevent the disconnection on the data transmission of the background application program.

In some embodiments, when the foreground application program and the background application program perform their data transmission in the persistent mode, sub-operations S246-S248 are repeatedly executed to find an optimal bandwidth share between the foreground/background application programs, it ensure the foreground application program to have enough foreground throughput and prevent the background application program from being disconnected.

Based on the wireless communication device and the control method of aforesaid embodiments, it detects the competition for the total usable bandwidth between the foreground application program and the background application program. Once the competition occurs, the data transmission induced by the background application program is limited to utilize a relative lower bandwidth share, so as to release more usable bandwidth to the foreground application program. When there is no competition, the limitation will be cancelled, and the background application program is able to perform the data transmission with a relative higher bandwidth share. The wireless communication device and the control method will be able to provide a better user experience of the foreground network service.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A wireless communication device, comprising:
   a transceiver configured to establish a telecommunication connection with a total usable bandwidth; and
   processing circuitry coupled to the transceiver, the processing circuitry configured at least to:
     monitor a foreground throughput of data transmission induced by a foreground application program and a background throughput of data transmission induced by a background application program over the telecommunication connection;
     detect whether the foreground application program and the background application program compete for the total usable bandwidth or not according to variations of the foreground throughput and the background throughput; and
     if the foreground application program and the background application program compete for the total usable bandwidth, limit the data transmission induced by the background application program;
   wherein in order to detect whether the foreground application program and the background application program compete for the total usable bandwidth or not, the processing circuitry is configured to:
   reduce a background bandwidth share within the total usable bandwidth from a first level to a second level lower than the first level to reduce the bandwidth used by the background application program;
   detect whether the foreground throughput increases or not after reducing the background bandwidth share; and
   if the foreground throughput does not increases, restore the background bandwidth share to the first level to increase the bandwidth used by the background application program, wherein the foreground application program and the background application program are regarded as not competing.

2. The wireless communication device of claim 1, wherein the background bandwidth share is reduced from the first level to the second level when the data transmission of the foreground application program is switched from an idle mode to a burst mode and the data transmission of the background application program is in a persistent mode.

3. The wireless communication device of claim 1, wherein if the foreground throughput increases after reducing the background bandwidth share, the foreground application program and the background application program are regarded as competing for the total usable bandwidth, the background bandwidth share is maintained at the second level to limit the data transmission induced by the background application program.

4. The wireless communication device of claim 1, wherein if the foreground throughput increases after reducing the background bandwidth share, the processing circuitry is further configured to:
   detect whether an increment of the foreground throughput reaches a decrement of the background throughput after reducing the background bandwidth share; and
   if the increment of the foreground throughput is lower than the decrement of the background throughput, maintain the background bandwidth share at the second level; and
   if the increment of the foreground throughput reaches the decrement of the background throughput, reduce the background bandwidth share within the total usable bandwidth from the second level to a third level lower than the second level.

5. The wireless communication device of claim 4, wherein the increment of the foreground throughput and the decrement of the background throughput are detected when the data transmissions of the foreground application program and the background application program are in the persistent mode.

6. The wireless communication device of claim 4, wherein if the foreground throughput reaches the decrement of the background throughput after the latest reduction of the background bandwidth share, the processing circuitry is further configured to repeatedly reduce background bandwidth share until a minimum bandwidth share.

7. The wireless communication device of claim 1, wherein the processing circuitry is configured to restore the background bandwidth share to the first level when the foreground application program is terminated or the data transmission of the foreground application program is idle.

8. The wireless communication device of claim 1, wherein the processing circuitry is further configured to:
   monitor a plurality of application programs executed by the processing circuitry;
   distinguish a first group of the application programs currently running in foreground and a second group of the application programs currently running in background according to a list of process identifications; and
   calculate an overall throughput induced by the first group as the foreground throughput and another overall throughput induced by the second group as the background throughput.

9. A control method, suitable for a wireless communication device comprising a transceiver and processing circuitry, the transceiver being configured to establish a telecommunication connection, a foreground application program and a background application program being executed by the processing circuitry, the control method comprising:
   monitoring a foreground throughput of data transmission induced by the foreground application program and a background throughput of data transmission induced by the background application program over the telecommunication connection;
   detecting whether the foreground application program and the background application program compete for the total usable bandwidth or not according to variations of the foreground throughput and the background throughput; and
   limiting the data transmission induced by the background application program if the foreground application program and the background application program compete for the total usable bandwidth;

wherein in step of detecting whether the foreground application program and the background application program compete for the total usable bandwidth or not, the control method comprising:

reducing a background bandwidth share within the total usable bandwidth from a first level to a second level lower than the first level to reduce the bandwidth used by the background application program;

detecting whether the foreground throughput increases or not after reducing the background bandwidth share; and if the foreground throughput does not increases, restoring the background bandwidth share to the first level to increase the bandwidth used by the background application program, wherein the foreground application program and the background application program are regarded as not competing.

10. The control method of claim 9, wherein the background bandwidth share is reduced from the first level to the second level when the data transmission of the foreground application program is switched from an idle mode to a burst mode and the data transmission of the background application program is in a persistent mode.

11. The control method of claim 9, wherein if the foreground throughput increases, the foreground application program and the background application program are regarded as competing for the total usable bandwidth, the background bandwidth share is maintained at the second level to limit the data transmission induced by the background application program.

12. The control method of claim 9, wherein if the foreground throughput increases, the control method further comprising:

detecting whether an increment of the foreground throughput reaches a decrement of the background throughput after reducing the background bandwidth share; and if the increment of the foreground throughput is lower than the decrement of the background throughput, maintaining the background bandwidth share at the second level; and if the increment of the foreground throughput reaches the decrement of the background throughput, reducing the background bandwidth share within the total usable bandwidth from the second level to a third level lower than the second level.

13. The control method of claim 12, wherein the increment of the foreground throughput and the decrement of the background throughput are detected when the data transmissions of the foreground application program and the background application program are in the persistent mode.

14. The control method of claim 12, wherein if the foreground throughput reaches the decrement of the background throughput after the latest reduction of the background bandwidth share, the control method further comprises repeatedly reducing background bandwidth share until a minimum bandwidth share.

15. The control method of claim 9, wherein the control method further comprises:

restoring the background bandwidth share to the first level when the foreground application program is terminated or the data transmission of the foreground application program is idle.

16. The control method of claim 9, wherein the control method further comprises:

monitoring a plurality of application programs executed by the processing circuitry;

distinguishing a first group of the application programs currently running in foreground and a second group of the application programs currently running in background according to a list of process identifications; and calculate an overall throughput induced by the first group as the foreground throughput and another overall throughput induced by the second group as the background throughput.

* * * * *